(12) United States Patent
Kotecha et al.

(10) Patent No.: US 9,961,712 B2
(45) Date of Patent: May 1, 2018

(54) CONNECTION AND TRAFFIC MANAGEMENT IN A MULTIPLE CORE NETWORK ARCHITECTURE

(71) Applicant: Verizon Patent and Licensing Inc., Arlington, VA (US)

(72) Inventors: Lalit R. Kotecha, San Ramon, CA (US); Sagiv Draznin, Walnut Creek, CA (US); Matthew W. Nelson, Pleasanton, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 213 days.

(21) Appl. No.: 14/923,759

(22) Filed: Oct. 27, 2015

(65) Prior Publication Data

US 2017/0118791 A1    Apr. 27, 2017

(51) Int. Cl.
| | |
|---|---|
| *H04W 28/00* | (2009.01) |
| *H04W 76/04* | (2009.01) |
| *H04W 48/16* | (2009.01) |
| *H04W 4/00* | (2018.01) |

(52) U.S. Cl.
CPC ......... *H04W 76/046* (2013.01); *H04W 4/005* (2013.01); *H04W 48/16* (2013.01)

(58) Field of Classification Search
CPC .... H04W 48/16; H04W 4/005; H04W 76/046
See application file for complete search history.

(56) References Cited

U.S. PATENT DOCUMENTS

| | | | | |
|---|---|---|---|---|
| 6,535,979 B1* | 3/2003 | Vialen | ................... | H04W 12/02 370/343 |
| 6,636,502 B1* | 10/2003 | Lager | ................... | H04L 12/2856 370/352 |
| 7,130,281 B1* | 10/2006 | Surazski | ............... | H04M 9/082 370/289 |
| 2002/0086670 A1* | 7/2002 | Rajaniemi | .......... | H04W 76/045 455/560 |
| 2007/0121540 A1* | 5/2007 | Sharp | ................... | H04W 92/02 370/328 |
| 2011/0044200 A1* | 2/2011 | Kulyk | ..................... | G10L 25/69 370/252 |
| 2012/0077507 A1* | 3/2012 | Lee | ..................... | H04W 74/006 455/450 |
| 2012/0140760 A1* | 6/2012 | Schmidt | ................. | H04B 1/707 370/344 |
| 2013/0051326 A1* | 2/2013 | Jeyatharan | ............ | H04L 47/245 370/328 |
| 2013/0163556 A1* | 6/2013 | Lee | ................... | H04W 72/0446 370/330 |
| 2013/0201830 A1* | 8/2013 | Wang | ..................... | H04W 4/005 370/235 |
| 2013/0329653 A1* | 12/2013 | Russell, Jr. | ........... | H04W 4/005 370/329 |

(Continued)

*Primary Examiner* — Rina C Pancholi

(57) ABSTRACT

A base station may receive an indication to manage a connection, associated with a device, or traffic associated with the device. The indication may include a network identifier associated with a core network. The base station may determine, based on the network identifier, management information associated with managing the connection or the traffic associated with the device. The base station may manage, based on the management information, the connection or the traffic associated with the device.

20 Claims, 6 Drawing Sheets

200 ⟶

(56) References Cited

U.S. PATENT DOCUMENTS

| | | | |
|---|---|---|---|
| 2014/0064068 A1* | 3/2014 | Horn | H04W 28/0289 370/230 |
| 2014/0113556 A1* | 4/2014 | Kotecha | H04W 76/023 455/41.2 |
| 2014/0376426 A1* | 12/2014 | Boudreau | H04L 47/41 370/294 |
| 2015/0078280 A1* | 3/2015 | Lecroart | H04W 76/023 370/329 |

\* cited by examiner

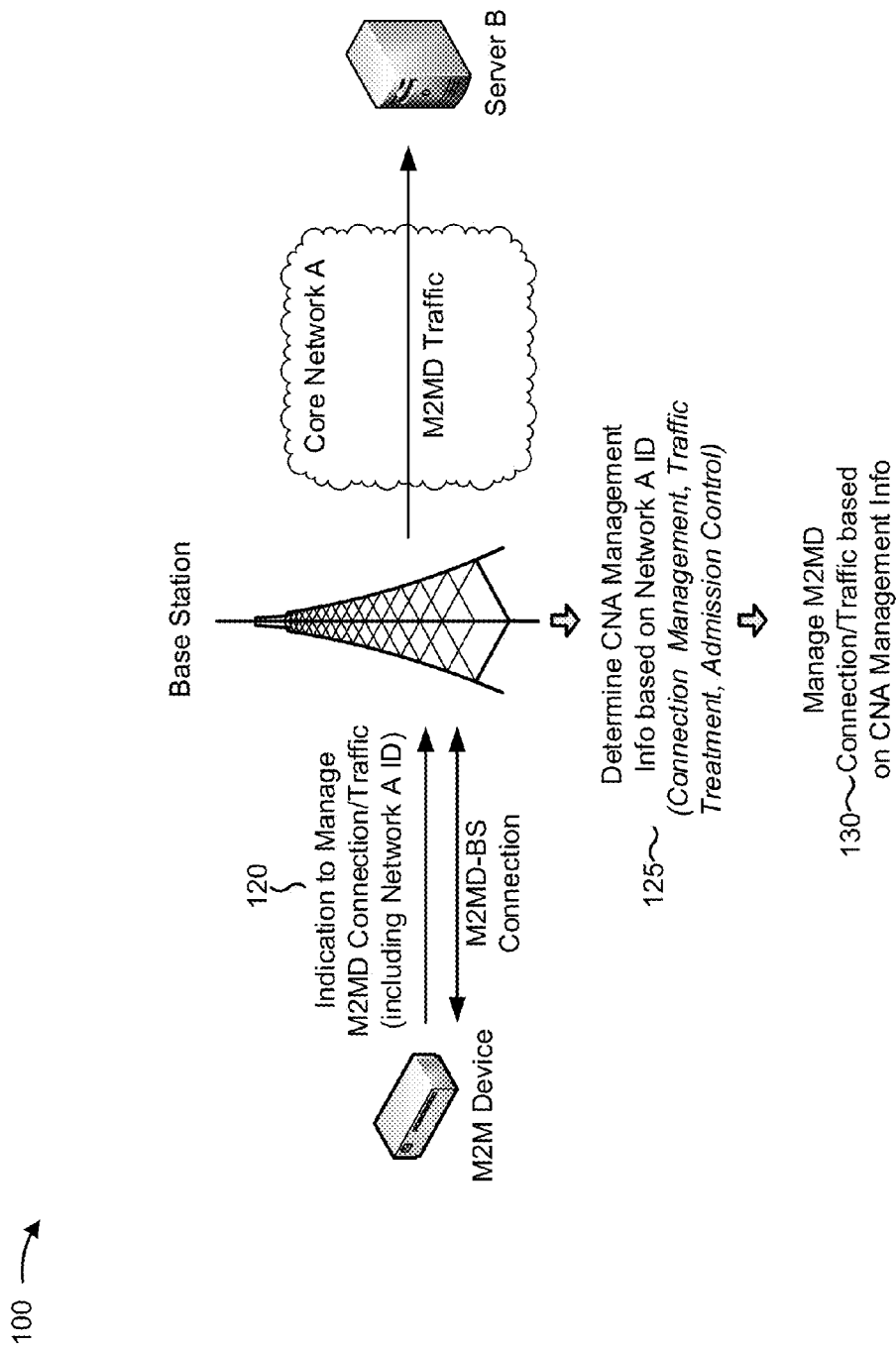

CONNECTION AND TRAFFIC MANAGEMENT IN A MULTIPLE CORE NETWORK ARCHITECTURE

BACKGROUND

A device, such as a user device, a machine-to-machine (M2M) device, or the like, may connect to a base station included in an access network. The connection with the base station may allow the device to send and/or receive information via a core network associated with the access network.

BRIEF DESCRIPTION OF THE DRAWINGS

FIGS. 1A and 1B are diagrams of an overview of an example implementation described herein;

DETAILED DESCRIPTION OF PREFERRED EMBODIMENTS

The following detailed description of example implementations refers to the accompanying drawings. The same reference numbers in different drawings may identify the same or similar elements.

A radio access network may allow devices of different types to communicate via a core network. For example, a long-term evolution (LTE) network may allow user devices (e.g., smart phones, tablets, etc.) and M2M devices (e.g., sensors, appliances, etc.) to communicate via a single core network (e.g., an evolved packet core (EPC)). However, the base station may not differentiate the user devices from the M2M devices when managing connections and/or traffic associated with the user devices and the M2M devices. As such, the core network may not effectively provide support for higher priority user device connections and/or traffic as a demand for lower priority M2M device support increases (i.e., the core network may support the lower priority M2M connections and/or traffic rather than higher priority user device connections and/or traffic).

Implementations described herein may allow a base station to separately manage user device connections and/or traffic and M2M device connections and/or traffic using a multiple core network architecture. In some implementations, the base station may identify the user devices and the M2M devices based on network identifiers corresponding to the user devices and the M2M devices, respectively, and may manage the connections and/or the traffic accordingly.

Figure 1A:
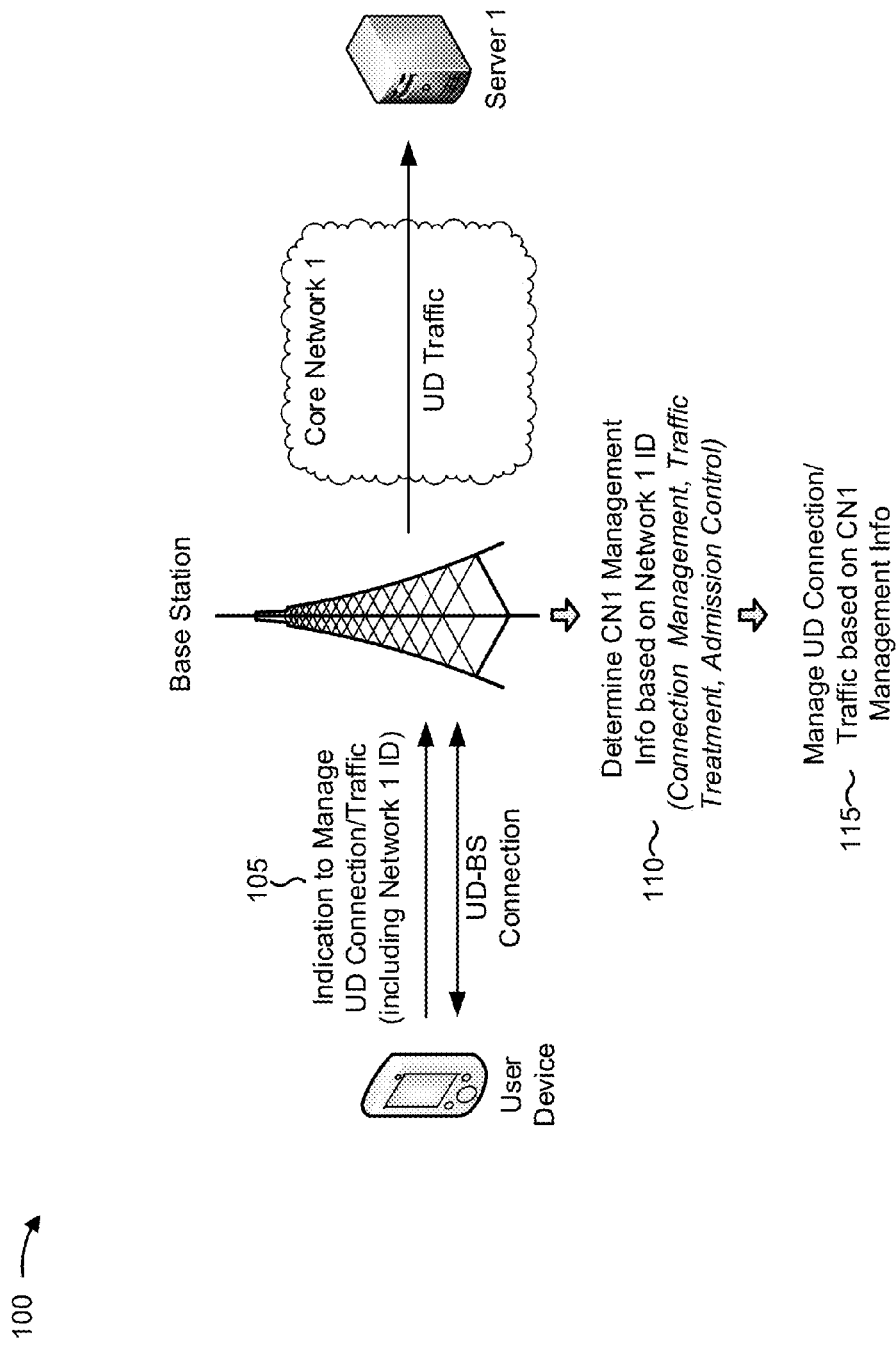

FIGS. 1A and 1B are diagrams of an overview of an example implementation 100 described herein. For the purposes of example implementation 100, assume that a user device is and a M2M device are capable of connecting with a base station such that the user device and the M2M device may send and/or receive traffic via a first core network and a second core network, respectively. In other words, assume that a service provider has implemented a multiple core network architecture, where the first core network is designed to process user device traffic, and the second core network is designed to process M2M device traffic.

As shown in FIG. 1A, and by reference number 105, the base station may receive (e.g., based on information provided by the user device) an indication that the base station is to manage a connection and/or traffic associated with the user device. For example, the base station may receive a request to establish a connection with the user device such that the user device may provide traffic via the first core network. As another example, the base station may receive traffic, provided by the user device, that is to be forwarded via the first core network (e.g., after the connection is established). As shown, the indication may include a first network identifier (e.g., Network 1 ID) that identifies the first core network.

As shown by reference number 110, the base station may determine, based on the first network identifier and information stored or accessible by the base station, first management information corresponding the first core network. The first management information may include information associated with managing connections and/or traffic associated with the first core network, such as connection management information associated with devices that are to communicate via the first core network, traffic treatment information for traffic to be provided via the first core network, admission control information associated with connections and/or traffic associated with the first core network, or the like.

As shown by reference number 115, the base station may manage the connection with the user device and/or the traffic associated with the user device based on the first management information. For example, the base station may permit or prevent the connection from being established based on the first management information, treat traffic in accordance with the first management information, maintain or tear down the connection in accordance with the first management information, or the like.

As shown in FIG. 1B, and by reference number 120, the base station may also receive (e.g., based on information provided by the M2M device) an indication that the base station is to manage a connection and/or traffic associated with the M2M device. For example, the base station may receive a request to establish a connection with the M2M device such that the M2M device may provide traffic via the second core network. As another example, the base station may receive traffic, provided by the M2M device, that is to be forwarded via the second core network (e.g., after the connection is established). As shown, the indication may include a second network identifier (e.g., Network A ID) that identifies the second core network.

As shown by reference number 125, the base station may determine, based on the second network identifier and information stored or accessible by the base station, second management information corresponding to the second core network. The second management information may include information associated with managing connections and/or traffic associated with the second core network, such as connection management information associated with devices that are to communicate via the second core network, traffic treatment information for traffic to be provided via the second core network, admission control information associated with connections and/or traffic associated with the second core network, or the like.

As shown by reference number 130, the base station may manage the connection with the M2M device and/or the traffic associated with the M2M device based on the second management information. For example, the base station may permit or prevent the connection from being established based on the second management information, treat traffic in accordance with the second management information, maintain or tear down the connection in accordance with the second management information, or the like.

In this way, a base station may separately manage user device connections and/or traffic and M2M device connections and/or traffic using a multiple core network architecture. As shown above, the base station may identify the user devices and the M2M devices based on network identifiers provided by the user devices and the M2M devices, respectively.

As indicated above, FIGS. 1A and 1B are provided merely as examples. Other examples are possible and may differ from what was described with regard to FIGS. 1A and 1B.

Figure 2:
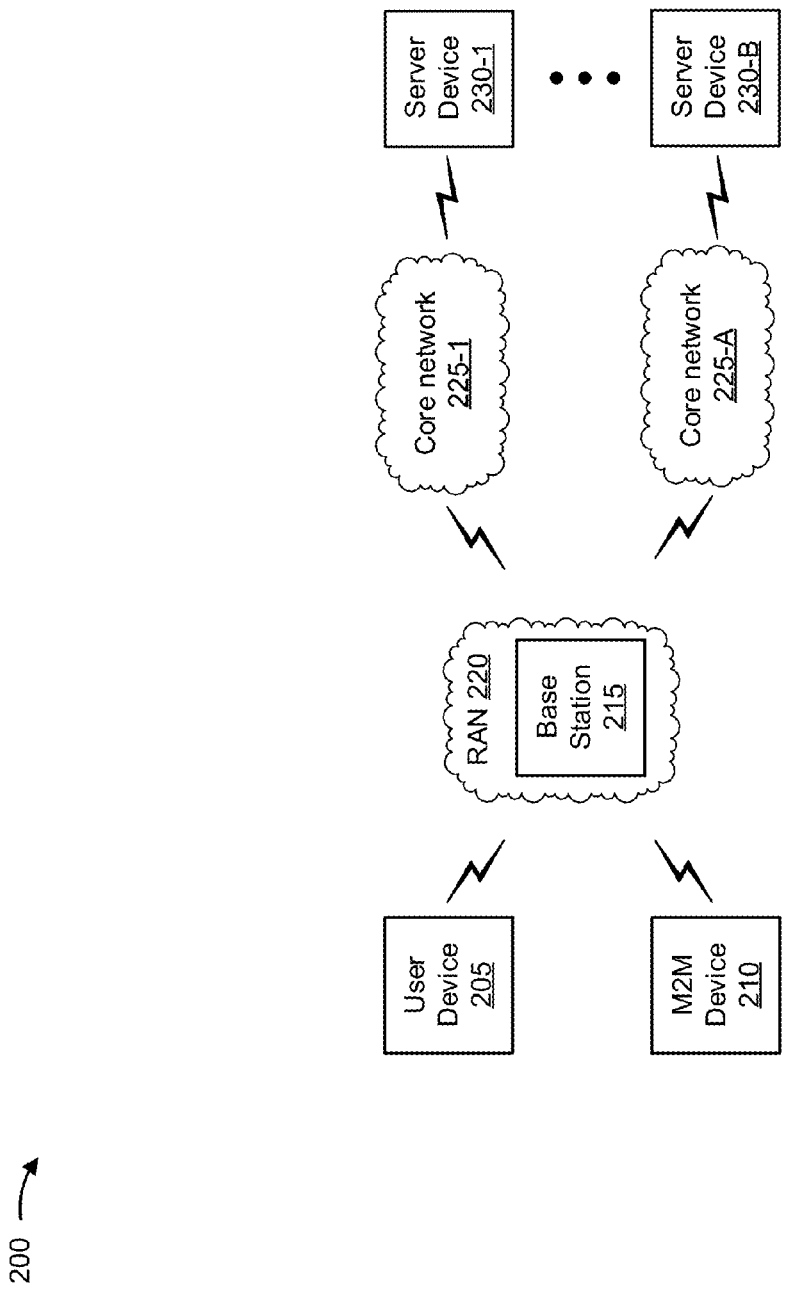
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 205, a M2M device 210, a base station 215 included in a radio access network (RAN) 220, two or more core networks 225-1 through 225-A (A>1), and one or more server devices 230-1 through 230-B (B≥1) (hereinafter referred to collectively as server devices 230, and individually as server device 230). Devices of environment 200 may interconnect via wired connections, wireless connections, or a combination of wired and wireless connections.

User device 205 may include one or more devices capable of receiving, generating, storing, processing, and/or providing information via RAN 220 and core network 225. For example, user device 205 may include a communication and computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a set-top box, or a similar type of device.

M2M device 210 may include a M2M device capable of receiving, processing, and/or providing information via RAN 220 and core network 225. For example, M2M device 210 may include a sensor, a camera, an audio recorder, a camcorder, an appliance (e.g., a refrigerator, a microwave, a stove, etc.), a medical device, a car, a light bulb, and/or any other smart device. In other words, M2M device 210 may be any "thing" in the Internet of Things (IoT).

Base station 215 may include one or more devices capable of communicating with user device 205 and M2M device 210 using a cellular radio access technology. For example, base station 215 may include a base transceiver station, a radio base station, a node B, an evolved node B (eNB), a base station subsystem, a cellular site, a cellular, a radio access node, a macrocell base station, a microcell base station, a picocell base station, a femtocell base station, or a similar type of device. Base station 215 may transfer traffic between user device 205 and core network 225 and between M2M device 210 and core network 225. In some implementations, base station 215 may communicate with user device 205 and M2M device 210 (and/or one or more other devices) using radio waves. As shown, in some implementations, base station 215 may be included in RAN 220 (e.g., a long term evolution (LTE) network) that provides user device 205 and M2M device 210 with access to core network 225.

Core network 225 may include one or more wired and/or wireless networks that allow user device 205 and M2M device 210, connected via RAN 220, to communicate with server devices 230. For example, core network 225 may include a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks. In one example implementation, core network 225 may correspond to an evolved packet core (EPC). The EPC may include one or more mobility management entities (MMEs), one or more serving gateways (SGWs), and one or more packet data network gateways (PGWs).

In some implementations, core network 225 may be configured to manage, process, and/or transfer traffic associated with user devices 205. Alternatively, core network 225 may be configured to manage, process, and/or transfer traffic associated with M2M devices 210. In other words, in some implementations, core network 225 may be designed to manage, process, and/or transfer traffic associated with a particular type of device or a group of different types of devices.

Server device 230 may include one or more devices capable of communicating with user device 205 and/or M2M device 210 via one or more core networks 225. For example, server device 230 may include a server or a group of servers.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
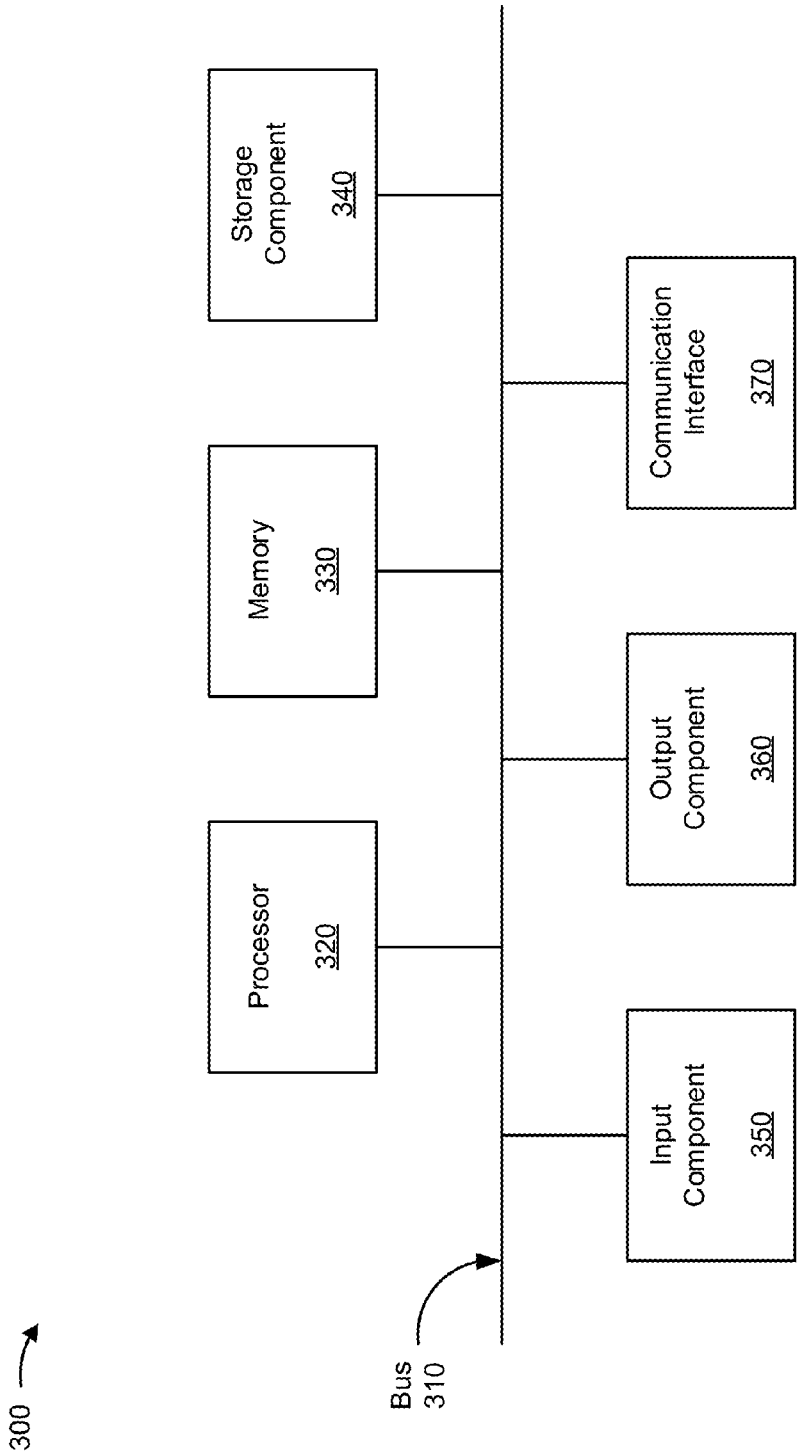
FIG. 3 is a diagram of example components of one or more devices of FIG. 2.

FIG. 3 is a diagram of example components of a device 300. Device 300 may correspond to user device 205, M2M device 210, base station 215, and/or server device 230. In some implementations, user device 205, M2M device 210, base station 215, and/or server device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 320 may include one or more processors capable of being programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
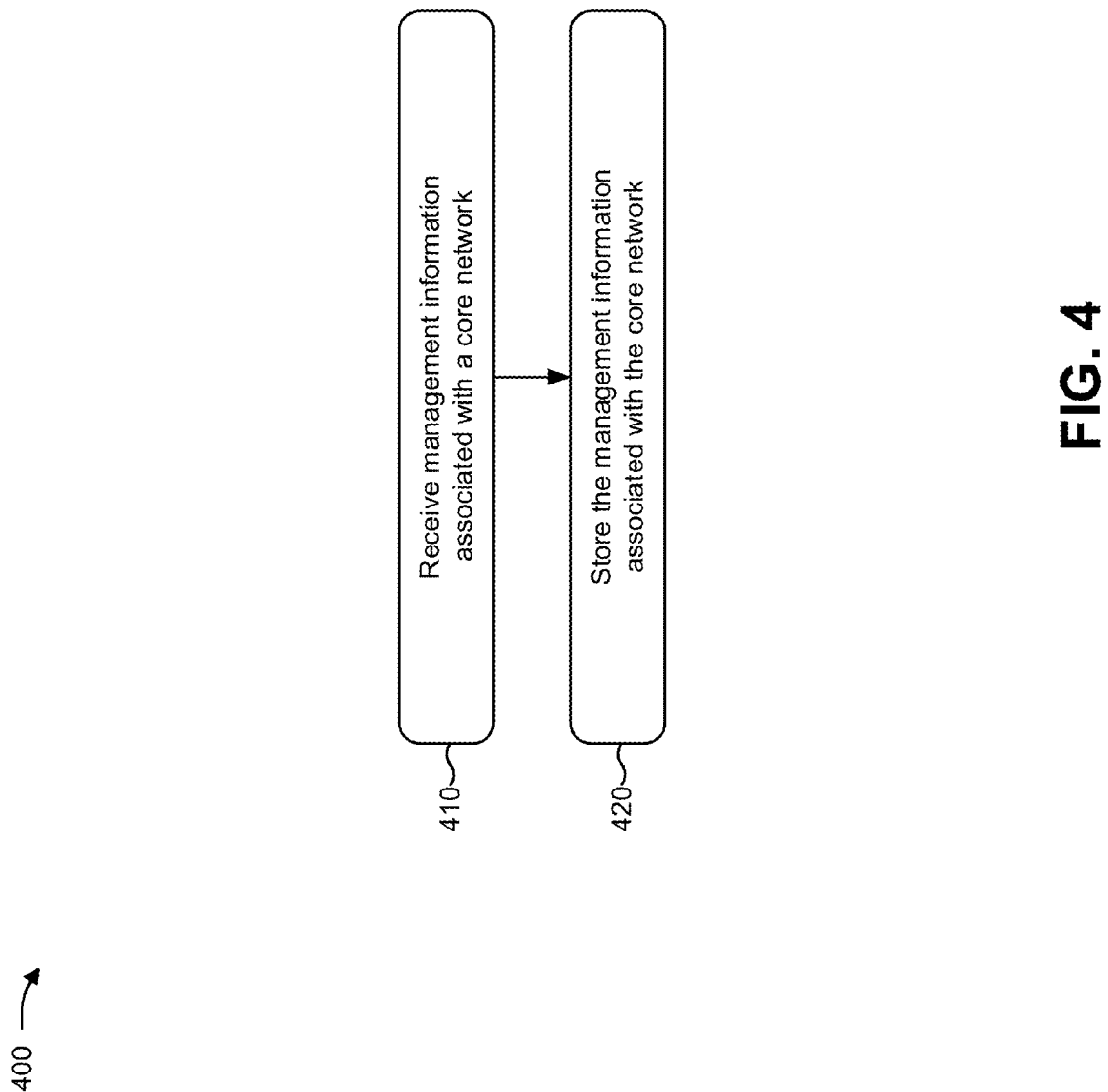
FIG. 4 is a flow chart of an example process for receiving and storing management information associated with a core network.

FIG. 4 is a flow chart of an example process 400 for receiving and storing management information associated with a core network. In some implementations, one or more process blocks of FIG. 4 may be performed by base station 215. In some implementations, one or more process blocks of FIG. 4 may be performed by another device or a group of devices separate from or including base station 215, such as another device or group of devices of environment 200.

As shown in FIG. 4, process 400 may include receiving management information associated with a core network (block 410). For example, base station 215 may receive management information associated with core network 225. In some implementations, base station 215 may receive the management information when a network administrator, associated with core network 225, provides user input associated with the management information. Additionally, or alternatively, base station 215 may receive the management information when another device provides the management information, such as a device included in core network 225.

The management information may include information associated with managing connections and/or traffic associated with core network 225. In some implementations, the management information may include information that identifies core network 225 to which the management information corresponds, such as a Public Land Mobile Network Identifier (PLMN ID). In some implementations, a first network identifier may correspond to a first core network 225 that is designed to support traffic associated with user devices 205, while a second network identifier may correspond to a second core network 225 that is designed to support traffic associated with M2M devices 210. As such, in some implementations, base station 215 may differentiate user device 205 connections and/or traffic from M2M device 210 connections and/or traffic based on a network identifier provided by user device 205 and M2M device 210. This may allow base station 215 to manage the connections and/or the traffic based on the network identifier, as described below.

In some implementations, the management information may include connection management information. For example, the management information may include information that identifies a manner in which Radio Resource Control (RRC) connections are to be managed by base station 215. As an example, the connection management information may include information that identifies an amount of time that base station 215 is to maintain a RRC connection when no traffic is being transmitted, such as one second after a last transmission, three seconds after a last transmission, 10 seconds after a last transmission, or the like.

In some implementations, first connection management information, corresponding to a first core network 225 via which user device 205 traffic is to travel, may differ from second connection management information corresponding to a second core network 225 via which M2M device 210 traffic is to travel. For example, the first connection management information may indicate that base station 215 is to maintain a RRC connection with user device 205 for a first amount of time, such as 10 seconds after a last transmission, while the second connection management information may indicate that base station 215 is to maintain a RRC connection with M2M device 210 for a second amount of time, such as one second after a last transmission, until traffic transmission stops, or the like. Here, by maintaining RRC connections with M2M devices 210 for a shorter amount of time (e.g., as compared to user devices 205), base station 215 may allow for radio resources that would otherwise be consumed by M2M devices 210, to be used by other M2M devices 210 and/or user devices 205. This may result in reduced congestion associated with establishing a RRC connection with base station 215, while also saving battery life of M2M devices 210.

Additionally, or alternatively, the management information may include traffic treatment information. For example, the management information may include information that identifies one or more Quality of Service (QoS) rules (e.g., a bearer with or without a guaranteed bit rate, a priority, a packet delay budget, a packet error loss rate, etc.) to be applied to traffic to be provided via core network 225. As an example, the traffic treatment information may include information that identifies a Quality of Service Class Identifier (QCI) (e.g., QCI 1 through QCI 9) associated with treating the traffic.

In some implementations, first traffic treatment information, corresponding to a first core network 225 via which user device 205 traffic is to travel, may differ from second traffic treatment information corresponding to a second core network 225 via which M2M device 210 traffic is to travel. For example, the first traffic treatment information may indicate that base station 215 is to provide a high quality bearer (e.g., QCI 1, QCI 2, etc.) for traffic associated with user device 205, while the second traffic treatment information may indicate that base station 215 is to provide a low quality bearer (e.g., QCI 8, QCI 9, etc.), or no bearer (e.g., only short messaging service (SMS) over network access stratum (NAS)) for traffic associated with M2M device 210. In this way, base station 215 may reserve high quality bearers for user devices 205 (e.g., rather than M2M devices 210). This may lead to improved QoS for user device 205 traffic.

Additionally, or alternatively, the management information may include admission control information for limiting communications via base station 215. For example, the management information may include information that identifies a threshold (e.g., a maximum) number of bearers that may be used at one time, a threshold number of devices (e.g., user device 205, M2M device 210) that may communicate via base station 215 at one time, a threshold number of RRC connections that base station 215 may support at one time, a threshold allowable bandwidth that the devices may consume at one time, or the like. In some implementations, the admission control information may correspond to a time of day. For example, for a particular core network 225, the admission control information may identify a first maximum allowable number of RRC connections for a first period of time (e.g., from 12:00 p.m. to 3:00 p.m.), and a second (i.e., different) maximum allowable number of RRC connections for a second period of time (e.g., 3:00 p.m. to 6:00 p.m.).

In some implementations, first admission control information, corresponding to a first core network 225 via which user device 205 traffic is to travel, may differ from second admission control information corresponding to a second core network 225 via which M2M device 210 traffic is to travel. For example, the first admission control information may indicate that base station 215 is to allow a higher number of RRC connections for user devices 205 (e.g., up to 2000 at one time) to communicate via base station 215, while the second admission control information may indicate that base station 215 is to allow a lower number of RRC connections for M2M devices 210 (e.g., up to 1000 at one time) to communicate via base station 215.

Additionally, or alternatively, the admission control information may indicate whether pre-emption is allowed. For example, the admission control information may indicate whether a bearer transferring traffic associated with M2M device 210 may be pre-empted for use in transferring traffic associated with user device 205. As such, in some implementations, preemption may allow user device 205 to communicate via base station 215 rather than M2M device 210. This may be useful when, for example, a user of user device 205 needs to place a voice call, place an emergency call, access a navigation service, or the like.

Additionally, or alternatively, the management information may include another type of information associated with managing connections and/or traffic associated with user devices 205 and M2M devices 210.

As further shown in FIG. 4, process 400 may include storing the management information associated with the core network (block 420). For example, base station 215 may store the management information. In some implementations, base station 215 may store the management information after base station 215 receives the management information. Additionally, or alternatively, base station 215 may store the management information when base station 215 receives information indicating that base station 215 is to store the management information from another device.

In some implementations, base station 215 may store the management information in a memory location (e.g., a RAM, a ROM, a cache, a hard disk, etc.) of base station 215. In some implementations, base station 215 may store information associated with the management information such that previous management information (e.g., management information received by base station 215 at an earlier time) is supplemented, modified, overwritten, deleted, or the like. Additionally, or alternatively, base station 215 may store the management information such that base station 215 may retrieve the management information at a later time.

In some implementations, base station 215 may store the management information such that base station 215 may perform a lookup using a network identifier associated with core network 225 (e.g., such that base station 215 may management information corresponding to the core network 225).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
FIG. 5 is a flow chart of an example process for managing a connection and/or traffic, associated with a core network, based on management information associated with the core network.

FIG. 5 is a flow chart of an example process 500 for managing a connection and/or traffic, associated with a core network, based on management information associated with the core network. In some implementations, one or more process blocks of FIG. 5 may be performed by base station 215. In some implementations, one or more process blocks of FIG. 5 may be performed by another device or a group of devices separate from or including base station 215, such as another device or group of devices of environment 200.

As shown in FIG. 5, process 500 may include receiving an indication to manage a connection and/or traffic associated with a core network (block 510). For example, base station 215 may receive an indication to manage a connection and/or traffic associated with core network 225. In some implementations, base station 215 may receive the indication when another device provides the indication, such as user device 205 or M2M device 210.

In some implementations, the indication may be associated with establishing a RRC connection with base station 215. For example, the indication may be a connection request, provided by user device 205, in order to allow user device 205 to establish a connection with base station 215 for transferring traffic via core network 225. As another example, the indication may be a connection request, provided by M2M device 210, in order to allow M2M device 210 to establish a connection with base station 215 for transferring traffic via core network 225.

Additionally, or alternatively, the indication may be associated with providing traffic via a connection with base station 215. For example, after a connection is established between user device 205 and base station 215, user device 205 may provide traffic to base station 215. Here, the traffic provided by user device 205 may be the indication that base station 215 is to manage the traffic associated with core network 225. As another example, after a connection is established between M2M device 210 and base station 215, M2M device 210 may provide traffic to base station 215. In this example, the traffic provided by M2M device 210 may be the indication that base station 215 is to manage the traffic associated with core network 225

In some implementations, the indication may include information that identifies core network 225. For example, a connection request and/or traffic, provided by user device 205, may include a first network identifier (e.g., a first PLMN ID) that identifies core network 225 via which the traffic, associated with user device 205, is to be provided. As another example, a connection request and/or traffic, provided by M2M device 210, may include a second network identifier (e.g., a second PLMN ID) that identifies core network 225 via which traffic, associated with M2M device 210, is to be provided. In some implementations, base station 215 may manage a connection and/or traffic based management corresponding the received network identifiers, as described below.

As further shown in FIG. 5, process 500 may include determining, based on information that identifies the core network, management information associated with the core network (block 520). For example, base station 215 may determine, based on the information that identifies core network 225, management information associated with core network 225. In some implementations, base station 215 may determine the management information after base station 215 receives the indication to manage the connection and/or the traffic.

In some implementations, base station 215 may determine the management information based the network identifier and management information stored or accessible by base station 215. For example, as described above, base station 215 may store management information corresponding to a group of core networks 225. Here, the management information for each core network 225 may include a corresponding network identifier. In this example, base station 215 may receive the indication, including the network identifier, and may perform a lookup using the network identifier in order to determine the management information associated with core network 225. In other words, base station 215 may determine the management information based on matching the received network identifier to a network identifier, stored or accessible by base station 215, that corresponds to the management information.

As further shown in FIG. 5, process 500 may include managing the connection and/or the traffic based on the management information (block 530). For example, base station 215 may manage the connection and/or the traffic based on the management information. In some implementations, base station 215 may manage the connection and/or the traffic after base station 215 determines the management information associated with core network 225.

In some implementations, base station 215 may manage the connection based on connection management information included in the management information. For example, assume that user device 205 is connected to base station 215 via a RRC connection such that user device 205 traffic may be provided via a first core network 225. Further, assume that first connection management information, associated with the first core network 225, indicates that base station 215 is to maintain a RRC connection with user device 205 for 10 seconds after a last traffic transmission (i.e., for a 10 second period when no traffic is being transmitted). In this example, base station 215 may detect that traffic associated with user device 205 has stopped, and may start a 10 second timer. Here, if the 10 second timer expires without further traffic transmission associated with user device 205, then base station 215 may tear down the RRC connection with user device 205.

As another example, assume that M2M device 210 is connected to base station 215 via a RRC connection such that M2M device 210 may be provided via a second core network 225. Further, assume that second connection management information, associated with the second core network 225, indicates that base station 215 is to maintain a RRC connection with M2M device 210 for one second after a last traffic transmission (i.e., for a one second period when no traffic is being transmitted). In this example, base station 215 may detect that traffic associated with M2M device 210 has stopped, and may start a one second timer. Here, if the one second timer expires without further traffic transmission associated with M2M device 210, then base station 215 may tear down the RRC connection with M2M device 210.

Additionally, or alternatively, base station 215 may manage the traffic based on traffic treatment information included in the management information. For example, assume that user device 205 is connected to base station 215 such that user device 205 traffic may be provided via the first core network 225. Further, assume that first traffic treatment information, associated with the first core network 225, indicates that base station 215 is to provide traffic, associated with the first core network 225, using a QCI 1 bearer. In this example, base station 215 may receive traffic from user device 205, and may provide the traffic to the first core network via a QCI 1 bearer, accordingly.

As another example, assume that M2M device 210 is connected to base station 215 such that M2M device 210 traffic may be provided via the second core network 225. Further, assume that second traffic treatment information, associated with the second core network 225, indicates that base station 215 is to provide traffic, associated with the second core network 225, using a QCI 9 bearer. In this example, base station 215 may receive traffic from M2M device 210, and may provide the traffic to the second core network via a QCI 9 bearer, accordingly.

Additionally, or alternatively, base station 215 may manage the connection and/or the traffic based on admission control information included in the management information. For example, assume that user device 205 provides, to base station 215, a RRC connection request associated with establishing a RRC connection to allow user device 205 to communicate via the first core network 225. Further, assume that first admission control information, associated with the first core network 225, indicates that base station 215 may support up to 2000 RRC connections associated with devices communicating via the first core network 225 at one time. If base station 215 determines, based on information stored or accessible by base station 215, that base station 215 is supporting less than 2000 RRC connections with devices communicating via the first core network 225 (e.g., less than 2000 user devices 205), then base station 215 may allow the RRC connection with user device 205 to be established. Alternatively, if base station 215 determines that base station 215 is supporting 2000 or more RRC connections with devices communicating via the first core network 225, then base station 215 may not allow the RRC connection with user device 205 to be established.

As another example, assume that M2M device 210 provides, to base station 215, a RRC connection request associated with establishing a RRC connection to allow M2M device 210 to communicate via the second core network 225. Further, assume that second admission control information, associated with the second core network 225, indicates that base station 215 may support up to 500 RRC connections with devices communicating via the second core network 225 at one time. If base station 215 determines, based on information stored or accessible by base station 215, that base station 215 is supporting less than 500 RRC connections with devices communicating via the second core network 225 (e.g., M2M devices 210), then base station 215 may allow the RRC connection with M2M device 210 to be established. Alternatively, if base station 215 determines that base station 215 is supporting 500 or more RRC connections with user devices 205, then base station 215 may not allow the RRC connection with M2M device 210 to be established.

As another example, assume that user device 205 provides, to base station 215 a RRC connection request associated with establishing a RRC connection to allow user device 205 to communicate via the first core network 225. Further, assume that base station 215 determines that base station 215 does not have sufficient radio resources available to support the RRC connection with user device 205. Finally, assume that second admission control information, associated with the second core network, indicates that RRC connections associated with the second core network 225, may be preempted for RRC connections associated with the first core network. Here, base station 215 may select (e.g., randomly, based on an activity level, based on a connection duration, etc.) a particular RRC connection, associated with the second core network 225 (e.g., a connection associated with M2M device 210), and may tear down the particular RRC connection in order to allow user device 205 to use the radio resources, associated with the particular RRC connection, to establish the RRC connection for communication via the first core network 225.

Additionally, or alternatively, base station 215 manage the connection and/or the traffic based on other information associated with user device 205 or M2M device 210. For example, base station 215 may receive, from a server associated with a network operator of core network 225, information that identifies a QoS profile corresponding to an identifier. In this example, when base station 215 receives the indication to manage the connection/traffic associated with user device 205 or M2M device 210, the indication may include the identifier. Base station 215 may then determine, based on the identifier, the QoS profile with which to manage the connection and/or traffic, and may manage the connection/traffic accordingly.

For example, the identifier may include a device identifier, such as an International Mobile Subscriber Identity (IMSI) associated with user device 205 or M2M device 210. This may allow user device 205 or M2M device 210 to be served in accordance with a QoS profile associated with the IMSI.

As another example, the identifier may include an application identifier (e.g., an application name, an application type, etc.). This may allow user device 205 or M2M device 210 to be served in accordance with a QoS profile associated with the application identifier. For example, user device 205 or M2M device 210 may be served via a first core network 225 for a first application (e.g., a high bandwidth application) and a second core network 225 for a second application (e.g., a signaling orient application) in accordance with the QoS profile associated with the application identifier.

As an additional example, the identifier may include timestamp (e.g., information that identifies a time at which the indication is received). This may allow user device 205 or M2M device 210 to be served in accordance with a QoS profile associated with the timestamp. For example, user device 205 or M2M device 210 may be served via a first core network 225 at a first time (e.g., during the day, during peak hours, etc.) and a second core network 225 at a second time (e.g., at night, during off peak hours, etc.) in accordance the QoS profile associated with the timestamp.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Implementations described herein may allow a base station to separately manage user device connections and/or traffic and M2M device connections and/or traffic using a multiple core network architecture. In some implementations, the base station may identify the user devices and the M2M devices based on network identifiers corresponding to the user devices and the M2M devices, respectively, and may manage the connections and/or the traffic accordingly.

The foregoing disclosure provides illustration and description, but is not intended to be exhaustive or to limit the implementations to the precise form disclosed. Modifications and variations are possible in light of the above disclosure or may be acquired from practice of the implementations. For example, while processes and/or methods described herein are described in the context of managing connections and/or traffic for user devices and M2M devices, these processes and/or methods may apply in another context, such as managing connections and/or traffic for another type of device (e.g., a SMS only user device), different devices of a same type, other different types of devices, or the like.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
receiving, by a base station, a first indication and a second indication,
the first indication being an indication to manage a connection, associated with a first device, or traffic, associated with the first device,
the first device being a user device,
the first indication including a first network identifier that identifies a first core network,
the second indication being an indication to manage a connection, associated with a second device or traffic, associated with the second device,
the second device being a machine-to-machine (M2M) device and being a different type of device from the user device, and
the second indication including a second network identifier that identifies a second core network,
the first network identifier being a first public land mobile network identifier (PLMN ID) and the second network identifier being a second PLMN ID,
the first PLMN ID being different than the second PLMN ID;
determining, by the base station and based on the first network identifier, first management information associated with managing the connection or the traffic associated with the first device;
determining, by the base station and based on the second network identifier, second management information associated with managing the connection or the traffic associated with the second device,
the second management information being different from the first management information;
managing, by the base station and based on the first management information, the connection or the traffic associated with the first device; and
managing, by the base station and based on the second management information, the connection or the traffic associated with the second device.

2. The method of claim 1, where managing the connection, associated with the first device, or the connection, associated with the second device, comprises:
determining first connection management information, associated with the first core network, or second connection management information, associated with the second core network,
the first connection management information and the second connection management information including information that identifies a manner in which a Radio Resource Control (RRC) connection with the first device is to be managed, and information that identifies a manner in which a RRC connection with the second device is to be managed, respectively, and
the first connection management information and the second connection management information being included in the first management information and the second management information, respectively; and
managing the connection, associated with the first device, or the connection, associated with the second device, based on the first connection management information or the second connection management information, respectively.

3. The method of claim 2, where the first management connection information differs from the second connection management information.

4. The method of claim 2, where the first management connection information includes information that identifies a first amount of time in which the RRC connection is to be maintained in connection with the first device; and
where the second management connection information includes information that identifies a second amount of time in which the RRC connection is to be maintained in connection with the second device.

5. The method of claim 1, where managing the traffic, associated with the first device, or the traffic, associated with the second device, comprises:
determining first traffic treatment information, associated with the first core network, or second traffic treatment information, associated with the second core network,
the first traffic treatment information and the second traffic treatment information including information that identifies a Quality of Service (QoS) rule for the traffic associated with the first device, and information that identifies a QoS rule for the traffic associated with the second device, respectively, and
the first traffic treatment information and the second traffic treatment information being included in the first management information and the second management information, respectively; and
managing the traffic, associated with the first device, or the traffic, associated with the second device, based on the first traffic treatment information or the second traffic treatment information, respectively.

6. The method of claim 1, where managing the connection, associated with the first device, or the connection, associated with the second device, comprises:
determining first admission control information, associated with the first core network, or second admission control information, associated with the second core network,
the first admission control information and the second admission control information including information that identifies a first threshold and information that identifies a second threshold, respectively, and the first admission control information and the second admission control information being included in the first management information and the second management information, respectively; and managing the connection, associated with the first device, or the connection, associated with the second device, based on the first admission control information or the second admission control information, respectively.

7. A base station, comprising:
one or more processors to:
receive a first indication and a second indication,
the first indication being an indication to manage a connection, associated with a first device, or traffic, associated with the first device,
the first device being a user device,
the first indication including a first network identifier associated with a first core network;
the second indication being an indication to manage a connection, associated with a second device or traffic, associated with the second device, and
the second device being a machine-to-machine (M2M) device and being a different type of device from the user device,
the second indication including a second network identifier that identifies a second core network,
the first network identifier being a first public land mobile network identifier (PLMN ID) and the second network identifier being a second PLMN ID,
the first PLMN ID being different than the second PLMN ID;
determine, based on the first network identifier, first management information associated with managing the connection or the traffic associated with the first device;
determine, based on the second network identifier, second management information associated with managing the connection or the traffic associated with the second device,
the second management information being different from the first management information;
manage, based on the first management information, the connection or the traffic associated with the first device; and
manage, based on the second management information, the connection or the traffic associated with the second device.

8. The base station of claim 7, where the one or more processors, when managing the connection, associated with the first device, are to:
determine first connection management information, associated with the first core network,
the first connection management information including information that identifies a manner in which a Radio Resource Control (RRC) connection with the first device is to be managed, and
the first connection management information being included in the first management information; and
manage the connection, associated with the first device, based on the first connection management information.

9. The base station of claim 8, where the one or more processors, when managing the connection, associated with the second device, are to:
determine second connection management information, associated with the second core network,
the second connection management information including information that identifies a manner in which a Radio Resource Control (RRC) connection with the second device is to be managed, and
the second connection management information being included in the second management information; and
manage the connection, associated with the second device, based on the second connection management information.

10. The base station of claim 9, where the first management connection information includes information that identifies a first amount of time in which the RRC connection is to be maintained in connection with the first device; and
where the second management connection information includes information that identifies a second amount of time in which the RRC connection is to be maintained in connection with the second device.

11. The base station of claim 7, where the one or more processors, when managing the traffic, associated with the first device, are to:
determine first traffic treatment information, associated with the first core network,
the first traffic treatment information including information that identifies a Quality of Service Class Identifier (QCI) associated with treating the traffic associated with the first device, and
the first traffic treatment information being included in the first management information; and
manage the traffic, associated with the first device, based on the first traffic treatment information.

12. The base station of claim 7, where the one or more processors, when managing the connection, associated with the first device, are to:
determine first admission control information, associated with the first core network,
the first admission control information including information that identifies a threshold, and
the first admission control information being included in the first management information; and
manage the connection, associated with the first device based on the first admission control information.

13. The base station of claim 7, where the one or more processors, when managing the traffic, associated with the second device, are to:
determine second traffic treatment information, associated with the second core network,
the second traffic treatment information including information that identifies a Quality of Service Class Identifier (QCI) associated with treating the traffic associated with the second device, and
the second traffic treatment information being included in the second management information; and
manage the traffic, associated with the second device, based on the second traffic treatment information.

14. The base station of claim 7, where the one or more processors, when managing the connection, associated with the second device, are to:
determine second admission control information, associated with the second core network,
the second admission control information including information that identifies a threshold, and
the second admission control information being included in the second management information; and
manage the connection, associated with the second device based on the second admission control information.

15. A non-transitory computer-readable medium storing instructions, the instructions comprising:

one or more instructions that, when executed by one or more processors, cause the one or more processors to:
receive a first indication and a second indication,
the first indication being an indication to manage a connection, associated with a first device, or traffic, associated with the first device, and including a first public land mobile network identifier (PLMN ID) that identifies a first network,
the first device being a user device, and
the second indication being an indication to manage a connection, associated with a second device or traffic, associated with the second device, and including a second PLMN ID that identifies a second network,
the second device being a machine-to-machine (M2M) device and being a different type of device from the user device, and
the first PLMN ID being different than the second PLMN ID;
determine, based on the first PLMN ID, first management information associated with managing the connection or the traffic associated with the first device;
determine, based on the second PLMN ID, second management information associated with managing the connection or the traffic associated with the second device;
manage, based on the first management information, the connection or the traffic associated with the first device; and
manage, based on the second management information, the connection or the traffic associated with the second device.

16. The non-transitory computer-readable medium of claim 15, where the one or more instructions, that cause the one or more processors to manage the connection, associated with the first device, or the connection, associated with the second device, cause the one or more processors to:
determine first connection management information, associated with the first network, or second connection management information, associated with the second network,
the first connection management information and the second connection management information including information that identifies a manner in which a Radio Resource Control (RRC) connection with the first device is to be managed, and information that identifies a manner in which a RRC connection with the second device is to be managed, respectively, and
the first connection management information and the second connection management information being included in the first management information and the second management information, respectively; and
manage the connection, associated with the first device, or the connection, associated with the second device, based on the first connection management information or the second connection management information, respectively.

17. The non-transitory computer-readable medium of claim 16, where the first management connection information differs from the second connection management information.

18. The non-transitory computer-readable medium of claim 16, where the first management connection information includes information that identifies a first amount of time in which the RRC connection is to be maintained in connection with the first device; and
where the second management connection information includes information that identifies a second amount of time in which the RRC connection is to be maintained in connection with the second device.

19. The non-transitory computer-readable medium of claim 15, where the one or more instructions, that cause the one or more processors to manage the traffic, associated with the first device, or the traffic, associated with the second device, cause the one or more processors to:
determine first traffic treatment information, associated with the first network, or second traffic treatment information, associated with the second network,
the first traffic treatment information and the second traffic treatment information including information that identifies a Quality of Service (QoS) rule for the traffic associated with the first device, and information that identifies a QoS rule for the traffic associated with the second device, respectively, and
the first traffic treatment information and the second traffic treatment information being included in the first management information and the second management information, respectively; and
manage the traffic, associated with the first device, or the traffic, associated with the second device, based on the first traffic treatment information or the second traffic treatment information, respectively.

20. The non-transitory computer-readable medium of claim 15, where the one or more instructions, that cause the one or more processors to manage the connection, associated with the first device, or the connection, associated with the second device, cause the one or more processors to:
determine first admission control information, associated with the first network, or second admission control information, associated with the second network,
the first admission control information and the second admission control information including information that identifies a first threshold and information that identifies a second threshold, respectively, and
the first admission control information and the second admission control information being included in the first management information and the second management information, respectively; and
manage the connection, associated with the first device, or the connection, associated with the second device, based on the first admission control information or the second admission control information, respectively.

* * * * *